United States Patent Office 3,458,480
Patented July 29, 1969

3,458,480
PRODUCTION OF CARBOXYLAMIDE GROUP-CONTAINING POLYESTERIMIDE RESINS
Karl Schmidt and Gerhard Neubert, Hamburg, Germany, assignors to Dr. Beck & Co. G.m.b.H., Hamburg, Germany
No Drawing. Continuation of application Ser. No. 448,829, Apr. 16, 1965. This application Feb. 16, 1968, Ser. No. 706,191
Claims priority, application Germany, Apr. 25, 1964, B 76,521
Int. Cl. C08g *20/30*
U.S. Cl. 260—75       8 Claims

ABSTRACT OF THE DISCLOSURE

A process for the preparation of a carboxylamide-containing polyesterimide resin which comprises the steps of reacting at least one acid component which contains (a) an imide-forming functional group which is a five-membered cyclic anhydride or two carboxyl groups bound to adjacent carbon atoms, or their esters, half esters, or half amides (b) at least one further functional group which is a carboxyl, carboxylic acid anhydride, carboxylic ester, or hydroxyl group, with at least one polyhydric alcohol and at least one amine component which contains a primary amino group and at least one other functional group which is a carboxyl, hydroxyl, or primary or secondary amino group, to form a polycondensation product containing, in addition to ester and amide groups, at least one five-membered imide ring, wherein the number of primary amino groups employed is in excess of the primary amino groups bound in the cyclic imide groups or at least one polyfunctional compound containing secondary amino groups is present in the reaction mixture. The resins are characterized by high resistance to thermal overloads and are especially well suited for use as insulation of electrical conductors.

---

This application is a continuation of application Ser. No. 448,829, filed Apr. 16, 1965.

This invention relates to processes for preparing polyesterimide resins.

U.S. patent applications 283,315, filed No. 2, 1962, and replaced by 659,234, filed Aug. 8, 1967; 371,093, filed May 28, 1964, and replaced by 658,008, filed Aug. 2, 1967; and 384,262, filed July 21, 1964, and replaced by 707,879, filed Feb. 23, 1968, describe the preparation of a new class of synthetic resins, which are characterized in that they contain both polyester groups and cyclic imide groups. By reason of this constitution, these resins are also called polyesterimide resins. They can be obtained, for example, by condensing polybasic carboxylic acids with polyhydric alcohols, opttionally with the concurrent use of hydroxycarboxylic acids and/or aminocarboxylic acids and/or aminoalcohols, where at least one of the starting materials contains one or more five-membered imide rings in such configuration, that the functional groups of the compound concerned are interlinked over several ring members of the imide ring involved. However, the formation of the imide ring may also take place simultaneously with the formation of the polycondensation product, so that the most varied possibilities for preparing these polyesterimides are available and are described in the aforementioned prior U.S. patent applications 238,315, 371,093 and 384,262.

The products made from these resins, for example, films, foils or fibres, have an excellent thermal stability and good resistance to solvents, as well as a high film hardness and flexibility. Particularly striking is the extraordinarily high resistance against thermal overloads. For this reason, these synthetic resins are especially advantageous for use as insulation for electrical conductors.

As acid components for the preparation of the imide-compounds there are primarily employed such compounds which, in addition to a five-membered cyclic anhydride group, have at least one further functional group taking part in the formation of the polycondensation product; these additional functional groups may, in particular, be carboxyl-, carboxylic acid anhydride-, carboxylic ester-, or hydroxyl groups.

However, instead of the five-membered cyclic acid anhydride group, the molecule of the acid component may also contain other reactive groups equivalent to the cyclic acid anhydride group with respect to the imide-forming reaction, such as two carboxyl groups bound to adjacent carbon atoms, or their esters, half-esters, half-amides, or the like.

As amine-components for the preparation of the imide-group containing compounds, such compounds may be used which, in addition to a primary amino group, contain at least one other reactive group capable of intervening in the formation of the polycondensation product; this additional reactive group may be a carboxyl-, hydroxyl- or, in particular, another primary amino group. Functional derivatives of the free primary amino-groups may equally be used in the reaction, e.g. salts formed with carboxylic acids, amides, lactams and polyamides, on condition that the amino-groups they contain are reactive in imide-formation.

When carrying out this process, the starting materials are expediently employed in such proportions by weight that the proportion of the functional acid groups, which lead to the formation of the cyclic imide groups, is at least equivalent to the amount of primary amino groups employed. The carboxylic acid-, carboxylic ester- or carboxylic anhydride groups in excess over the amount required for the imide-forming reaction then will react with the hydroxyl-group containing compounds with formation of esters.

It has now been found, that certain properties of the esterimide-resins can be improved still further when the amine-components are employed in excess in relation to the imide-group forming acid components. This qualitative improvement of the ester-imide resins is of importance especially with regard to their use as electrical insulators. In particular, it has been found, that the modification of the ester-imide resins according to the invention considerably increases the stability of this insulating material against thermal overloads and its thermal compression strength.

According to the invention, there is provided a process for the preparation of a polyesterimide resin which comprises the steps of reacting at least one polybasic carboxylic acid or a reactive derivative thereof with at least one polyhydric alcohol and at least one primary amine or reactive derivative thereof to form a polycondensation product containing, in addition to ester groups, at least one five-membered imide ring, wherein the number of primary amino groups employed is in excess of the primary amino groups bound in the cyclic imide group or groups and/or at least one polyfunctional compound containing secondary amino groups is present in the reaction mixture.

The result of the method employed according to the invention is that the nitrogen is present in the polycondensation product, not only in the form of cyclic imide groups, but also in the form of carboxylamide groups. It was found, that this additional incorporation of carboxylamide groups into the polycondensation products of the esterimide-resin type leads to the aforedescribed important qualitative improvements.

The total amount of the amino-compounds used according to the invention is preferably such, that the number of the primary amino groups is not more than 90%, preferably not more than 70%, of the sum of cyclic dicarboxylic anhydride groups or of their imide-forming derivatives and of the further isolated carboxyl groups or of their amide-forming derivatives. These limits preferably also apply in cases where mixtures of compounds having primary amino groups and compounds having secondary amino groups are employed, in which cases these limits relate to the sum of primary and secondary amino groups.

As examples of imide-group forming acid components having a further functional group there may particularly be mentioned pyromellitic anhydride and trimellitic anhydride. However, other carboxylic acid anhydrides can also be used, such as the dianhydride of naphthalene-tetracarboxylic acid or dianhydrides of tetracarboxylic acids having two benzene ring systems in the molecule, in which the carboxyl groups are located in the 3,3′, 4,4′ positions.

As examples of amino-components with a primary amino-group there may be mentioned di- and polyvalent primary amines, for example ethylenediamine, hexamethylenediamine, 4,4′-dicyclohexanediamine and, preferably, aromatic diamines, e.g. benzidine, diaminodiphenylmethane, diaminodiphenyl ketone, diaminodiphenylsulphone, diaminodiphenyl ether, diaminodiphenyl thioether, phenylenediamine, toluylenediamine, as well as diamines having more than two benzene rings in the molecule, for example, bis-(4-aminophenoxy)-1,4-benzene, or bis-(4-aminophenoxy)-4,4′-diphenylpropane-2,2 as well as condensation products prepared under acid reaction conditions from aromatic primary monoamine such as aniline or diprimary diamines and a carbonyl compound, especially formaldehyde. Further, there may also be used for this purpose amino-alcohols such as monoethanolamine, monopropanolamine or dimethylethanolamine, as well as aminocarboxylic acids such as glycine, aminopropionic acids, aminocaproic acids, or aminobenzoic acids. Moreover, for the formation of amido groups there may also be used a proportion of amino-components with secondary amino-groups, such as piperazine, N,N′-dimethylphenylenediamines and diethylenetriamine.

As amino-components with primary and/or secondary amino-groups, preferably di- or polyvalent aromatic amines are used.

The preparation of the new ester-imide resins, which in addition to the cyclic imide groups also contain carboxylamido-groups, can be carried out in the most diverse ways. Thus, for example, it is possible to proceed according to the disclosures of U.S. patent application 238,315 by first preparing polyfunctional components containing cyclic imide groups, in particular the corresponding dicarboxylic acids, and reacting these subsequently with alcohols and further amino group containing compounds, with formation of ester groups and carboxylamido groups. However, it is also possible, and may be particularly preferred, to effect the total synthesis of the polycondensation product in such a manner, that the formation of the cyclic imide rings takes place in the presence of other reactive and reacting functional groups of the polycondensation-resin, as also described, for example, in U.S. patent application 238,315.

In especially preferred methods of carrying out the invention, the incorporation of the amines which are to be used in excess in relation to the imide-group forming acid radicals is effected by one of the following methods; it is also possible to combine two of these methods with each other:

(1) The imide-group containing reaction components are prepared from amino-components having primary amino-groups and at least equivalent amounts of imide-group forming acid components, optionally in the presence of further esterification components, in known manner, whereafter the condensation is completed with the ester group forming components and the amido group forming components (which may contain secondary amino groups) these components being introduced either successively or simultaneously.

(2) From imide-group forming acid components and more than equivalent amounts of di- or polyvalent primary amines, optionally in the presence of further esterification components, there are prepared imide-components which contain primary amino groups and at least one further group accessible to esterification or amide-formation, whereafter said imide-components are condensed to completion either successively or simultaneously, optionally with further ester-group and amido-group forming reaction components.

(3) Using compounds containing primary and secondary amino groups and imide-forming acid components, optionally in the presence of further esterification components, there are prepared compounds having imide-groups and amido-groups and possible free secondary or primary amino groups and further esterifiable functional groups, which are subsequently condensed to completion successively or simultaneously, optionally with further ester-group and amido-group forming reaction components.

(4) From ester-group and/or amido-group forming reaction components there is first prepared in known manner a condensation product having a free primary amino group and containing ester-and/or amido groups, which is subsequently condensed to completion optionally with addition of further primary amines and optionally further esterification components, with amounts of imide-group forming acid components substantially equivalent to the amino groups.

Polycondensation products according to the invention which are hardenable, are of special importance, particularly those which are thermosetting. This property may be produced in the resins in accordance with generally known principles. In general, the resin is hardenable if the condensation product contains additional reactive functional groups, which may be brought into reaction by suitable measures, for example by a simple thermal treatment, in the course of which the individual condensate chains interlink with formation of a three-dimensional cross-linked spacial lattice. The proportion of more than difunctional components can be selected according to the desired degree of cross-linking of the hardened condensation product prepared according to the invention. The only other requirement is to prevent gelling of the polycondensation product during its preparation, by measures generally known in the art and as employed, for example, in the case of cross-linkable polyesters, e.g. the use of an excess of di- or polyhydric alcohols.

It has been found to be advantageous for the condensation and for the hardening of the condensation products according to the invention to employ lower glycols, such as propylene glycol and, preferably, ethylene glycol, in an amount of at least 10 equivalent-percent, preferably of at least 30 equivalent-percent, calculated on the sum of cyclic anhydride groups, or functional groups corresponding thereto, and additional carboxyl groups or functional derivatives thereof.

The condensation is advantageously carried out in a solvent known to be suitable for use in the preparation of such polycondensation products. Typical examples of such solvents are known solvents based on cresol and cresol mixtures. The same applies to other known reaction additives. Thus, the condensation is facilitated by the addition of the usual esterification catalysts, such as butyl titanate, and tin and antimony compounds.

The invention is illustrated by the following examples, in which all parts are by weight:

Example 1

To a solution of a condensation product which has been prepared with the aid of 2.7 parts of antimony trioxide and 2.7 parts of tin oxalate from 166.0 parts of terephthalic acid, 124 parts of ethylene glycol and 34.0 parts of pentaerythritol in 800 parts of technical grade cresol, there were added at 80° C. 198.0 parts of 4,4'-diaminodiphenylmethane and 384.0 parts of trimellitic anhydride. The temperature of the mixture was raised to 130° C. within 15 minutes and maintained at this temperature until all the trimellitic anhydride had dissolved. The reaction mixture was then heated to 200–215° C. in the course of one hour and was condensed at this temperature for 2 hours. There was obtained a clear solution of an imide-group-containing polyester resin. To this solution were added a further 198.0 parts of 4,4'-diaminodiphenylmethane and the temperature was maintained at 210° C. for two hours.

The varnish thus obtained was diluted with 300 parts of technical grade cresol, 500 parts of xylene and 500 parts of solvent naphtha, and was then deposited on a copper wire of 1 mm. diameter in a horizontal wire-enamelling furnace. Technical data: furnace length 3.50 m., furnace temperature 480° C., depositing device: roller and felt, 6 coats of varnish, take-off speed 5.0 m./minute, thickness of coating (increase of wire diameter) 0.05 mm.

Tests of the varnish insulation yielded the following data:

Pencil hardness _____ 4H
    After 30 minutes in benzene at 60° C. _____ 3H
    After 30 minutes in methylated
        spirit at 60° C. _____ 3H
    After 30 minutes in water at 60° C. _____ 3H On 30% elongation of the wire (copper break) the varnish film did not show any fissures or tendency to flaking.

The dielectric loss factor at 800 c./s. was at 20° C. 82, at 100° C. 64, at 180° C. 59 and at 220° C. 116.

Thermal shock test.—A winding of the wire about twice its own diameter was free from defects after one hour at 250° C.

Softening temperature according to German Standard Specification DIN 46,453/12 with a steel needle loaded with 1000 g. with a diameter of 1mm.: 342° C.

Overload test—The insulated wire, of 1 mm. nominal diameter is wound in four turns on a test body of porcelain according to German Standard Specification DIN 46,453. An iron core is introduced into the test body. To the coil thus formed, a voltage is applied which is so selected that the initial current intensity is 14.5 a. Owing to the heat of the current the resisance increases and the current intensity falls to approximately 9 a. As soon as the turns are short-circuited owing to partial failure of the insulator and the intensity of the current rises to 11 a, the test is considered as terminated. The time which has elapsed until this instant is considered as a measure of the overload capacity of wire insulation. In the present case, it was more than 500 minutes.

For purposes of comparison, the same imide-group containing resin, but without the addition of supplementary 4,4'-diaminodiphenylmethane for amido-group formation, was processed into a varnish and then subjected to the same tests as wire insulation. The ester-imide resin prepared with the same amounts of starting materials—with the exception of the additional diamine—yielded after dilution with 300 parts of technical grade cresol, 400 parts of xylene and 400 parts of solvent naphtha, under the same testing conditions but with a take-off speed of 4.0 m/minute on copper wire, a varnish insulation with the following data:

Pencil hardness _____ 3H
    After 30 minutes in benzene at 60° C. _____ 2H
    After 30 minutes in methylated spirit at 60° C. _ 2H
    After 30 minutes in water at 60° C. _____ 2H The dielectric loss factor, measured at 800 c./s., was 63 at 20° C., 60 at 100° C., 48 at 180° C. and 344 at 220° C. Softening temperature—316° C. Overload test—100 minutes.

Example 2

To a solution of a condensation product prepared with the aid of 2.7 parts of antimony trioxide and 2.7 parts of tin oxalate from 166.0 parts of terephthalic acid, 124 parts of ethylene glycol and 34.0 parts of pentaerythritol in 800 parts of cresol, there were added at 80° C. 396 parts of 4,4'-diaminodiphenylmethane and 384.0 parts by weight of trimellitic anhydride. The mixture was heated to 130° C. within 15 minutes and was kept at this temperature until complete dissolution of the trimellitic anhydride. The temperature of the reaction mixtures was then raised within one hour to 200–215° C. and the mixture was condensed at this temperature for 2 hours.

The polyester wire varnish thus obtained, containing imido and amido groups, was deposited on the wire after dilution as in Example 1. The testing of the insulation yielded the following values:

Pencil hardness _____ 3–4H
    After 30 minutes in benzene at 60° C. _____ 2–3H
    After 30 minutes in methylated spirit at
        60° C. _____ 2–3H A 30% elongation of the wire (copper break) did not cause any fissures or tendency to flaking of the varnish. Softening temperature—346° C. Overload test—over 400 minutes.

Example 3

To a solution of a condensation product prepared with the aid of 2.7 parts of antimony trioxide and 2.7 parts of tin oxalate from 166.0 parts of terephthalic acid, 124 parts of ethylene glycol, and 34.0 parts of pentaerythritol in 800 parts of technical grade cresol, there were added at 150° C. 396.0 parts by weight of 4,4'-diaminodiphenylmethane and the reaction mixture was kept at this temperature for 2 hours. To the solution of the amido and amino group containing condensation product thus obtained, there were added 384.0 parts of trimellitic anhydride. The temperature of the reaction mixture was raised to 200° C. within one hour and was held for 2 hours at 200–210° C.

The varnish thus obtained was diluted and tested as in Example 1. The test results differed only slightly from those of Example 2.

Pencil hardness _____ 3–4H
    After 30 minutes in benzene at 60° C. _____ 2–3H
    After 30 minutes in methylated spirit at
        60° C. _____ 2–3H On 30% elongation of the wire (copper break), the varnish was free of cracks and showed no tendency to flaking. Softening temperature—338° C. Overload test—over 420 minutes.

Example 4

10.3 parts of diethylenetriamine, dissolved in 330 parts of technical grade cresol, were mixed at 130° C. with 63.4 parts of trimellitic anhydride. The reaction mixture was then heated to 200° C. within 30 minutes and condensed at this temperature for 15 minutes. This was followed by the addition at 130° C. of 43.4 parts of ethylene glycol and two portions of 29.7 parts each of 4,4'-diaminodiphenylmethane and of 54.7 parts of trimellitic anhydride; after each addition of trimellitic anhydride the temperature was raised from 130° C. to 200° C. in the course of 40 minutes. Following this, the reaction mixture was condensed at 200–210° C. for 2½ hours, in the presence of 0.3 part of antimony trioxide and 0.3 part of tin oxalate.

The varnish thus obtained was further diluted with technical grade cresol and solvent naphtha and yielded on aluminium sheet a clear, hard and elastic coating after 2 hours hardening at 230° C.

Example 5

To a solution of 87 parts of ethylene glycol, 75 parts of glycerol and 49 parts of ethanolamine in 500 parts by weight of technical grade cresol, there were added at 80° C. 87 parts of pyromellitic anhydride, and the reaction mixture was condensed at 150–200° C. This was followed by the addition to the reaction mixture of a further 500 parts of cresol and, at 120° C., of 200 parts of 4,4'-diaminodiphenyl ether and 192 parts of trimellitic anhydride. The temperature was then raised to 200° C. in the course of one hour and maintained at this level for 10 minutes. After addition of 1 part of tin oxalate, 1 part of antimony trioxide and 388 parts of dimethyl terephthalate, the condensation was completed within 3 hours at 200–210° C. The varnish thus prepared was further diluted with technical grade cresol and solvent naphtha and yielded on aluminium sheet a clear, hard and elastic coating after 2 hours hardening at 230° C.

What is claimed is:

1. A process for the preparation of a carboxylamide-containing polyesterimide resin which comprises the steps of reacting at least one acid component which contains (a) an imide-forming functional group which is a five-membered cyclic anhydride or two carboxyl groups bound to adjacent carbon atoms, or their esters, half esters, or half amides (b) at least one further functional group which is a carboxyl, carboxylic acid anhydride, carboxylic ester, or hydroxyl group, with at least one polyhydric alcohol and at least one amine component which contains a primary amino group and at least one other functional group which is a carboxyl, hydroxyl, or primary or secondary amino group, to form a polycondensation product containing, in addition to ester and amide groups, at least one five-membered imide ring, wherein the number of primary amino groups employed is in excess of the primary amino groups bound in the cyclic imide groups or at least one polyfunctional compound containing secondary amino groups is present in the reaction mixture.

2. A process according to claim 1, wherein the reaction mixture includes one or more aminocarboxylic acids, aminoalcohols or hydroxycarboxylic acids.

3. A process according to claim 1 wherein the total amount of amino-compounds employed is such that the total number of amino groups does not exceed 90% of the sum of the number of cyclic dicarboxylic acid anhydride groups, or of combinations of reactive groups equivalent thereto, and the number of additional isolated carboxyl groups or their reactive derivatives capable of imide formation.

4. A process according to claim 3, wherein the total number of amino groups does not exceed 70% of the sum of the number of cyclic dicarboxylic acid hydride groups, or of combinations of reactive groups equivalent thereto, and the number of additional isolated carboxyl groups.

5. A process according to claim 1, wherein an aromatic amine containing at least 2 amino groups is used.

6. A process according to claim 1 wherein the polycondensation product produced is hardenable.

7. A process according to claim 6, wherein the polycondensation product produced is thermosetting.

8. Polyesterimide resins prepared by the process of claim 1.

References Cited
UNITED STATES PATENTS

| | | | |
|---|---|---|---|
| 3,274,159 | 9/1966 | Kluiber | 260—75 |
| 3,238,181 | 3/1966 | Anderson | 360—75 |

WILLIAM H. SHORT, Primary Examiner

M. GOLDSTEIN, Assistant Examiner

U.S. Cl. X.R.

117—128.4, 232; 260—33.6, 47

PO-1050
(5/69)

UNITED STATES PATENT OFFICE
CERTIFICATE OF CORRECTION

Patent No. 3,458,480   Dated July 29, 1969

Inventor(s) Karl Schmidt, et al.

It is certified that error appears in the above-identified patent and that said Letters Patent are hereby corrected as shown below:

1. Col. 1, line 45, "283,315" should be --238,315--

2. Col.1, line 45, "No. 2" should be --Nov. 2--

3. Col.8, line 14, "hydride" should read --anhydride--

SIGNED AND
SEALED
JAN 27 1970

(SEAL)
Attest:

Edward M. Fletcher, Jr.
Attesting Officer

WILLIAM E. SCHUYLER, JR.
Commissioner of Patents